May 6, 1924. 1,492,941
H. B. SHERMAN ET AL
EMBEDDED SPRINKLER APPARATUS
Filed Jan. 19, 1922  2 Sheets-Sheet 1
Fig.1.
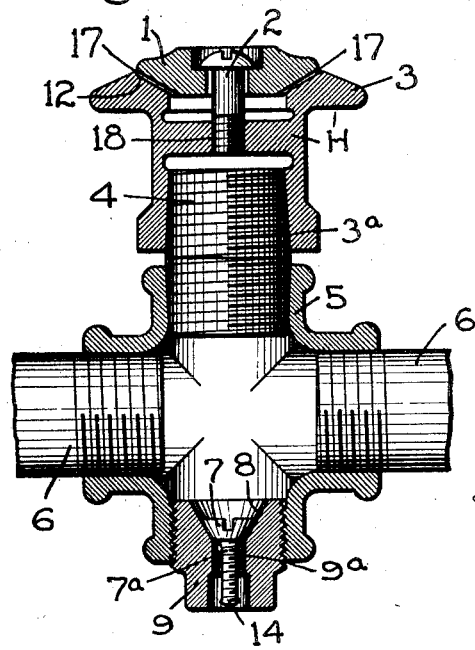
Fig.2.
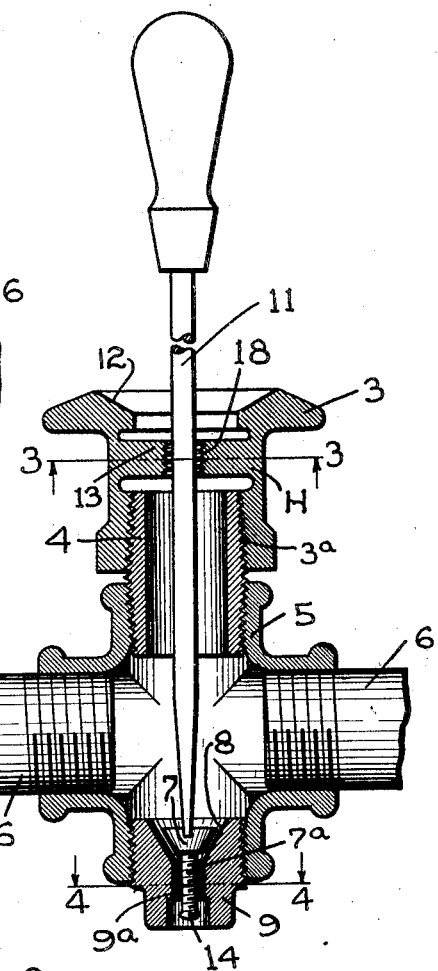
Fig.3.
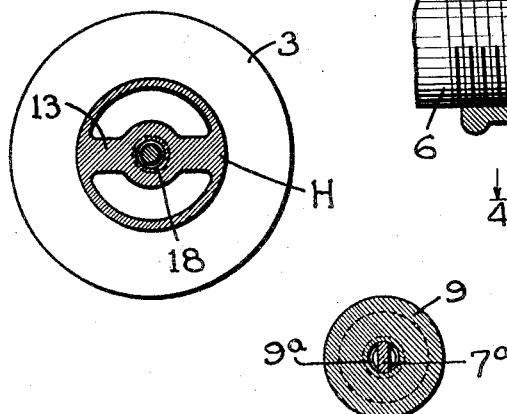
Fig.4.
Inventor
Howard B. Sherman
and Donald M. Bliss
By Alexander Powell
Attorneys May 6, 1924.
H. B. SHERMAN ET AL
1,492,941
EMBEDDED SPRINKLER APPARATUS
Filed Jan. 19, 1922  2 Sheets-Sheet 2
Fig.5.
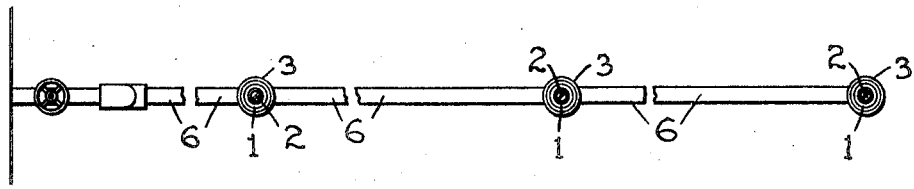
Fig.6.
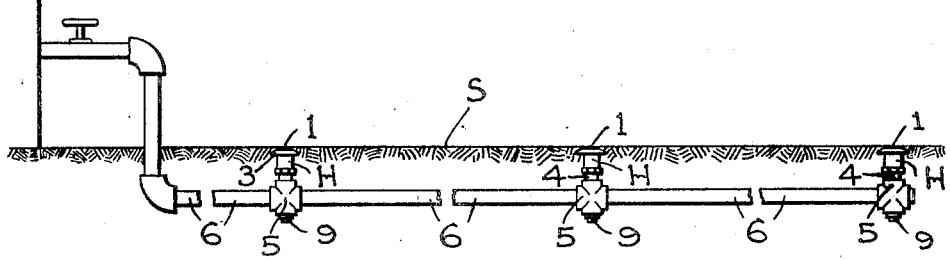
Fig.7.  Fig.9.  Fig.10.
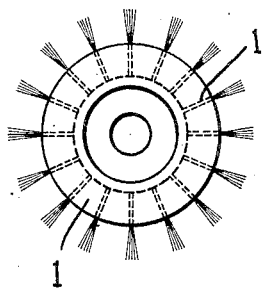 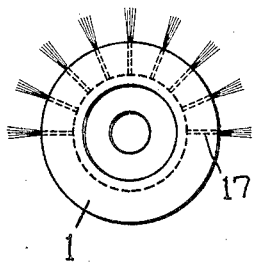 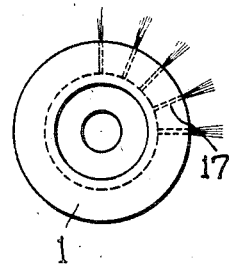
Fig.8.  Fig.11.
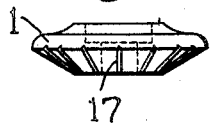 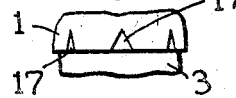
Inventor
Howard B. Sherman
and Donald M. Bliss
By
Alexander S. Snell
Attorney.

Patented May 6, 1924.

1,492,941

UNITED STATES PATENT OFFICE.

HOWARD B. SHERMAN AND DONALD M. BLISS, OF BATTLE CREEK, MICHIGAN, ASSIGNORS TO H. B. SHERMAN MANUFACTURING CO., OF BATTLE CREEK, MICHIGAN, A CORPORATION OF MICHIGAN.

EMBEDDED SPRINKLER APPARATUS.

Application filed January 19, 1922. Serial No. 530,330.

*To all whom it may concern:*

Be it known that we, HOWARD B. SHERMAN and DONALD M. BLISS, citizens of the United States, residing at Battle Creek, in the county of Calhoun and State of Michigan, have invented certain new and useful Improvements in Embedded Sprinkler Apparatus; and we hereby declare that the following is a full, clear, and exact description thereof, reference being had to the accompanying drawings, which form part of this specification.

This invention is a novel improvement in sprinklers for watering lawns, gardens and the like; and is especially adapted for use in sprinkler systems where a number of sprinkler heads are located at different points of the surface to be sprinkled and are supplied with water from a common supply pipe, buried beneath such surface.

Heretofore sprinkler heads have been located at various points of the surface to be watered and connected with water supply pipes laid beneath the surface. Ordinarily the supply pipe must be so laid that it will drain to one common point, and this requires great care in laying the supply pipes; and it is a further object of the present invention to enable the supply pipe to be laid immediately beneath the sod without any particular care as to inclination or level and yet enable it to be positively drained. And in our invention the supply pipe can be laid immediately beneath the sod and can follow the contour of the ground, and the sprinkler heads can be used at any desired place high or low; and below each sprinkler head, if desired, can be installed a drain.

Other objects and advantages of the invention will be hereinafter set forth. In the accompanying drawings we have illustrated one practical embodiment of the invention and will explain the same with reference thereto, and thereafter set forth in the claims the essentials of the invention and the novel features of construction and novel combinations of parts for all of which protection is desired.

In said drawings;

Fig. 1 is a vertical sectional view of a sprinkler head, the connection thereof to a supply pipe, and the drain devices.

Fig. 2 is a similar view showing the spraying disk removed and a screw driver inserted to operate the draining valve.

Fig. 3 is a detail sectional view on the line 3—3 Fig. 2.

Fig. 4 is a detail section on the line 4—4 Fig. 2.

Fig. 5 is a conventional plan view of a pipe line fitted with three sprinkler heads.

Fig. 6 is a side elevation of Fig. 1 showing the relative arrangement of sprinkler heads and drain valves.

Fig. 7 is a detailed top plan view of a spray disk adapted to sprinkle a full circle.

Fig. 8 is a side view of a spraying disk such as shown in Fig. 7.

Fig. 9 is a top view of a spraying disk adapted to sprinkle a half circle, and

Fig. 10 is a top view of a spraying disk adapted to sprinkle a one quarter circle.

Fig. 11 is an enlarged detail view of the spraying disk.

The sprinkler head as shown in Figs. 1 and 2 comprises a tubular casting having an internally threaded lower end, indicated at 3ª, for engagement with the upper end of a pipe section 4; and preferably has an exterior flange 3 surrounding its upper end. The upper end of the head is conically recessed around the end of the bore on a 30° angle, this recess forming a smooth conical seat 12 upon which is fitted an oppositely conically tapered spraying disk 1, which may be secured in position by any suitable means. The top of flange 3 is tapered downwardly and outwardly on an angle of about 30° as shown, the upper edges of the seat 12 and of the flange 3 meeting on an obtuse angle. The disk 1 is preferably removably secured by a screw 2 extending through a central opening in the spraying disk 1 and engaging a threaded opening 18 in a bridge piece 13 that extends diametrically across the interior of the head H, and is preferably formed integral therewith.

The spraying disk 1 should be neatly fitted and closely held against the seat 12, and is preferably of such diameter that its outer edge is flush with the outer upper edge of the seat 12 and top of flange 3. Between the opposed surfaces of the spraying disk and the seat 12 are provided a number of radially disposed grooves 17 of such shape and length as to give a maximum throw of water as will be described later. These grooves may be made in the spraying disk, or in the seat 12, or in both, but preferably we make them in the spraying disk as indicated in Figs. 8 and 11 of the drawings.

We have found that these grooves 17 may be small in area, if of the right proportion, so that the total amount of flow in each head may not reduce the water pressure seriously; and that when properly made two or three of such heads can be operated with good results on a three quarter inch supply pipe, at the average pressure of eighty pounds. We have found that with such a supply pipe the best results are obtained if the total cross sectional area of the grooves in one spray disc amounts to between one eighth and three sixteenths of a square inch.

The length of groove 17 should not be less than five times its diameter, for if it is reduced below this the streams break up into spray or mist. We, therefore, preferably so proportion the grooves that their length is about ten times their diameter. If the grooves are made much longer than this the friction developed in the long grooves reduces the flow of the stream.

To increase the projection of small high pressure streams or jets from the head it is desirable to bevel the surface of the flange 3 as shown in Figs. 1 and 2; which prevents any interference by said surface with the projection of the jets of water issuing from the grooves.

We preferably made the grooves triangular in cross section as shown in Fig. 11, such grooves being easily made and readily cleaned. Other forms of groove may be used provided such grooves are properly proportioned.

Our sprinkler heads can be readily made with grooves 17 so disposed as to spread the water in a complete circle as in Fig. 7, or in a half circle, as in Fig. 9, or in a quarter circle, as in Fig. 10, or over any section of a circle; and this enables them to be used to sprinkle corners and to be placed next to side walks without annoying passers-by.

In practically utilizing the invention a system of piping 6 is laid underground to supply water to the sprinkler heads, which are connected therewith at desired intervals, or properly spaced apart as indicated in Figs. 5 and 6. These sprinkler heads are connected to the pipe 6 by the pipe sections 4 which will of course vary in length according to the distance that the sprinkler heads are removed from the inlet end of the pipe 6, the inclination of the pipe 6, or inequalities in the surface. Preferably each pipe section 4 to which a sprinkler head is connected is also connected to the upper end of a cross coupling 5 such as is commonly used in plumbing which has four branches, the horizontal branches of this coupling being connected to sections of the supply pipe 6 (which is made in sections extending from one coupling to another as indicated in Figs. 5 and 6) in the usual manner as indicated in Figs. 1 and 2. The other branches of the cross coupling 5 are perpendicular, and into the upper branch is screwed the lower end of the pipe section 4, to the upper end of which a sprinkler head H is attached; and in the lower vertical branch of the coupling 5 is screwed a plug 9 carrying a drip valve.

The average lawn is of rolling or uneven character; and in freezing climates the water should be removed from the pipes to prevent freezing thereof; therefore we provide suitable means for draining each head and piping when the water is cut off. As shown the plug 9 is centrally bored and has a conical seat 8 at its upper end which is adapted to be closed by the conical head 7 of a drain valve having a threaded stem $7^a$ adapted to engage a threaded part $9^a$ of the bore of plug 9. Said stem $7^a$ preferably is flattened on two sides, as shown in Figs. 2 and 4 so that when the valve 7 is slightly unseated as in Fig. 2, any water in the device will drain out through the bore in the plug 9. By removing the spraying disk 1 and bolt 2; the shank 11 of a screw driver can be inserted into the device through the opening 18, (as indicated in Fig. 2) and the valve 7 turned to closed or open position as desired. The opening in bridge 13 and the conical recess 8 serve to direct the end of the screw driver 11 accurately to the drain valve 7 when it is desired to adjust it. This is an important practical feature especially if the pipe section 4 is long. The lower end of the stem $7^a$ of valve 7 is swaged or headed as at 14 to prevent its being completely unscrewed or removed from the plug.

The pipes 6 are preferably set sufficiently deep to be beneath the frost line while the sprinkler heads are preferably set flush with the roots of the grass so that the lawn can be cut with a lawn mower without interfering with the heads. When it is desired to sprinkle the lawn the water is turned into a section of this piping, and the series of connected heads begin to operate; then when such area of lawn is properly sprinkled this section is cut off, and another one turned on. The novel heads will spray the water over a large surface thus reducing the number of heads required for a given area.

The sprinkler heads are preferably placed in the ground so that their upper ends will be flush with the roots of the grass or with the surface S of the garden or lawn to be sprinkled. The valves 7 should be closed before water is turned into the system but after the water has been shut off, in a supply line provided with one or more of these sprinklers, the valves 7 should be opened to drain out the system.

In installing the system the ordinary pipe and plumbers' fittings, such as elbows, T's and crosses, can be used, and no skilled labor is required.

Our novel sprinklers use a minimum of water to cover a maximum area due to the fact that the water is disseminated in small jets very close to the ground and does not rise in a towering spray to be disseminated or deflected by wind. The area that is intended to be sprinkled is sprinkled. Our sprinkler heads only use about one-third of the water that ordinary heads or ordinary sprinklers do; and this renders it possible for from two to four of our sprinkler heads to be used on a pipe line supplied by the ordinary house service pipe. The ordinary residence water supply pipe is a three-quarter inch pipe and such pipe is only capable of supplying one ordinary sprinkler, or one nozzle of the ordinary type used for sprinkling lawns; while with our invention two, three or four of our heads can be supplied with water from such a supply pipe and all will perform their office. Furthermore our sprinklers water the ground more like natural rains and there is less liability of puddles forming and a more thorough gentle soaking of the ground is obtained.

In our invention it is not necessary to lay the pipe 6 on any particular grade, as each head can be drained immediately below it whereas in other systems it is necessary to have the pipe laid accurately so that the draining can be done at one point. Drainage is particularly essential in all parts of the country subject to freezing weather and a system that can be completely drained is very essential.

In actual practice with a single head we can obtain an evenly distributed spray of fifty to sixty feet in diameter on an average pressure of seventy five to eighty pounds, supplied through three quarter inch pipe. With two heads, on the same supply, we can get forty to forty five foot circles.

We find that by accurately machining or fitting the conical spray disc to its seat in the cup and by making the grooves in the disc of uniform size and of a certain proportion between diameter and length, we are able to obtain the described results.

The claims in the present application have been restricted by official requirement to the Sprinkler system or apparatus; and the Sprinkler head and screw operable drain valve respectively form subjects matter for divisional applications, Serial No. 618,358, filed February 10, 1923; and Serial No. 618,359, filed February 10, 1923, Patent #1,465,004.

We claim:

1. In combination with a sprinkler head having a cylindric body provided with internally threaded lower end, an orifice at its upper end; a spreader disk closing the orifice, a transverse bridge piece in the body provided with a centrally threaded aperture and a screw engaging the aperture to secure the spreader disk in position; said disk and screw being removable; with a supply pipe connected to said head, a connection in said pipe below said head, a plug in said connection provided with a bore having a valve seat in its inner end and a threaded portion; a valve having a threaded shank engaging the threaded part of the bore and having a head adapted for engagement with a screw driver and to fit on said valve seat to close the bore, said valve being accessible by removing the spreader and screw and inserting the shank of a driver through the threaded opening in said partition whereby the valve may be manually opened or closed.

2. In combination with a sprinkler head having a cylindric body provided with internally threaded lower end, an orifice at its upper end; a conically flared recess exterior to and surrounding the orifice, a conical spreader disk fitted in said conical recess and closing the orifice, a transverse bridge piece in the body provided with a centrally threaded aperture and a screw engaging the aperture to secure the spreader disk in position; said disk and screw being removable; with a supply pipe connected to said head, a branch in said pipe below said head, a plug in said branch provided with a bore having a conical valve seat in its inner end and a threaded portion; a valve having a threaded shank engaging the threaded part of the bore and having a conical head adapted for engagement with a screw driver and to fit on said valve seat to close the bore, said valve being accessible by removing the spreader and screw and inserting the shank of a screw driver through a threaded opening in said partition, whereby the valve may be manually opened or closed.

3. In combination a supply pipe, a sprinkler head attached thereto, said pipe having a threaded branch below said sprinkler head, a removable plug in said branch provided with a bore having a valve seat in its inner end and a threaded portion; a valve having a threaded shank engaging the threaded part of the bore and having a head adapted for engagement with a screw driver and to fit on said valve seat to close the bore, said screw valve being accessible by inserting the shank of a screw driver through the sprinkler head whereby the valve may be manually opened or closed at will.

4. In combination a body, a supply pipe connected to said body, a sprinkler head at top of the body having a removable part, a drain opening in said body below the sprinkler head, a drain valve adapted to close said opening and having a threaded shank engaging a threaded part of the opening and having a head adapted to close the opening and having its inner end adapted for engagement with a driver; said drain valve being manually operable by removing the removable part of the sprinkler head and engaging the valve by the shank of a driver inserted into the body through the opening left by said removable part.

In testimony that we claim the foregoing as our own, we affix our signatures.

HOWARD B. SHERMAN.
DONALD M. BLISS.